(12) United States Patent
Tansel

(10) Patent No.: US 11,788,239 B1
(45) Date of Patent: Oct. 17, 2023

(54) CONTINUOUS GRANULAR MATERIAL LAYING BY USING TEMPORARY STORAGE BINS

(71) Applicant: Ibrahim N. Tansel, Miami, FL (US)

(72) Inventor: Ibrahim N. Tansel, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/324,520

(22) Filed: May 26, 2023

Related U.S. Application Data

(60) Provisional application No. 63/368,436, filed on Jul. 14, 2022.

(51) Int. Cl.
*E01C 19/20* (2006.01)

(52) U.S. Cl.
CPC ...... *E01C 19/202* (2013.01); *E01C 2019/208* (2013.01); *E01C 2301/00* (2013.01)

(58) Field of Classification Search
CPC .............. E01C 19/202; E01C 2019/208; E01C 2301/00
USPC ........ 222/610, 614, 618, 619, 623; 404/101, 404/109, 110, 107, 108, 83; 239/672, 239/687
See application file for complete search history.

(56) References Cited

U.S. PATENT DOCUMENTS

| | | | | |
|---|---|---|---|---|
| 4,830,533 A * | 5/1989 | Miller | ............... | E01C 23/06 404/101 |
| 4,874,283 A * | 10/1989 | Hurley, Jr. | ............. | E01C 19/182 404/108 |
| 6,213,680 B1* | 4/2001 | Schaeffer | ................ | E01C 19/47 404/93 |
| 10,704,208 B1* | 7/2020 | Prather | ................... | E01C 19/48 |
| 2003/0142579 A1* | 7/2003 | Throop | ................... | E01C 19/47 427/136 |
| 2007/0033840 A1* | 2/2007 | Schmidt | ............... | E02F 3/7609 404/96 |
| 2013/0269735 A1* | 10/2013 | Roetzel | ................... | B08B 3/102 134/40 |
| 2016/0221761 A1* | 8/2016 | Walder | ................. | B65G 41/002 |
| 2018/0297788 A1* | 10/2018 | Grathwol | .............. | B65G 43/08 |
| 2019/0003133 A1* | 1/2019 | Tkachenko | ............ | E01C 19/004 |
| 2020/0130556 A1* | 4/2020 | Weiler | .................... | B65G 67/30 |
| 2020/0324688 A1* | 10/2020 | Anderson | ............. | H05B 47/19 |
| 2020/0359566 A1* | 11/2020 | Schlimgen | ................ | B60P 1/42 |

* cited by examiner

*Primary Examiner* — Lien M Ngo
(74) *Attorney, Agent, or Firm* — Saliwanchik, Lloyd & Eisenschenk

(57) ABSTRACT

Systems, devices, machines, and methods for granular material laying are provided. A granular material laying machine can include at least one small storage bin that moves with a distribution head to temporarily store granular material. The at least one small storage bin can be filled when the distribution head brings it in front of an exit hole of a main storage bin (separate from the at least one small storage bin). While the distribution head discharges the granular material at the desired locations, the small temporary storage bin(s) provide(s) the material.

20 Claims, 11 Drawing Sheets

CONTINUOUS GRANULAR MATERIAL LAYING BY USING TEMPORARY STORAGE BINS

CROSS-REFERENCE TO RELATED APPLICATION

This application claims the benefit of U.S. Provisional Application Ser. No. 63/368,436, filed Jul. 14, 2022, the disclosure of which is hereby incorporated by reference in its entirety, including all figures, tables, and drawings.

BACKGROUND

Engineers want to keep the center of gravity of granular material storage bins as low as possible. If it is desired to distribute the material in a controlled manner with a distribution head from one side of a vehicle to the other side, it is very difficult to move the material from a storage bin to a distribution head with a pipe.

BRIEF SUMMARY

In order to address the problem stated in the Background, embodiments of the subject invention provide novel and advantageous systems, devices, machines, and methods for granular material laying (e.g., asphalt laying), with a solution of using one or two small storage bins that move with a distribution head to temporarily store a granular material. The small storage bin(s) can be filled when the distribution head brings them in front of an exit hole of a main storage bin (separate from the small storage bin(s)). While the distribution head discharges the granular material at the desired locations, the small temporary storage bin(s) provide(s) the material.

In an embodiment, an autonomous machine for laying granular material (e.g., asphalt) can comprise: a frame; a hopper connected to the frame and having an outlet at a lower portion of a first sidewall of the hopper; a head assembly connected to the frame and disposed facing the first sidewall of the hopper; and a horizontal screw disposed in the hopper and configured to move the granular material out of the outlet of the hopper. The head assembly can comprise: a vertical cylinder having a discharge port at a bottom thereof; a vertical screw disposed in the vertical cylinder; an active vertical slide configured to move the vertical cylinder in a vertical direction perpendicular to a lower surface of the hopper; an active horizontal slide configured to move the head assembly in a horizontal direction perpendicular to the vertical direction; and two temporary storage bins disposed adjacent the vertical cylinder. Each temporary storage bin can comprise a side opening facing the vertical cylinder and a front opening facing the hopper and configured to receive the granular material through the outlet of the hopper.

Each temporary storage bin can have a volume that is no more than 60% of a volume of the hopper. The machine can further comprise a front-facing image sensor (e.g., camera) connected to the frame and/or a downward-facing image sensor (e.g., camera) connected to the frame. The machine can further comprise four wheels connected to the frame and four wheel motors respectively connected to the four wheels and configured to respectively drive the four wheels. The vertical cylinder can comprise a first opening and a second opening respectively facing the two temporary storage bins and configured to receive the granular material from the respective side openings of the two temporary storage bins. The machine can be configured such that the outlet of the hopper is, for example, no more than 24 inches (e.g., no more than 18 inches, no more than 12 inches, or no more than 6 inches) above a ground surface during use. The head assembly can further comprise a passive horizontal slide configured to allow the head assembly to move in the horizontal direction. The horizontal screw can have a constant root diameter. The vertical screw can have a tapered root diameter (tapered so it gets smaller as the discharge port is approached, or alternatively tapered so it gets larger as the discharge port is approached), and it can be configured to compress the granular material before it is released through the discharge port of the vertical cylinder. The machine can further comprise: at least one microcomputer configured to operate the machine; an active vertical slide motor configured to drive the active vertical slide; an active horizontal slide motor configured to drive the active horizontal slide; a vertical screw motor configured to drive the vertical screw; a horizontal screw motor configured to drive the horizontal screw; and/or at least one controller (e.g., six controllers) configured to power the active vertical slide motor, the active horizontal slide motor, the vertical screw motor, the horizontal screw motor, and the four wheel motors. The front-facing image sensor can be configured to provide images to the at least one microcomputer to assist in steering the machine and/or detecting obstacles. The downward-facing image sensor can be configured to provide images of already-laid granular material and/or of a ground surface to the at least one microcomputer to assist in mapping contours of the ground surface (e.g., of potholes in the ground surface). The head assembly can further comprise a cover for the outlet of the hopper. The at least one microcomputer can be configured to operate the machine such that: the active horizontal slide moves the head assembly such that the front opening of a first temporary storage bin of the two temporary storage bins lines up with the outlet of the hopper and receives the granular material in the first temporary storage bin; the horizontal screw moves to push the granular material out of the outlet of the hopper; the active horizontal slide moves the head assembly such that the front opening of a second temporary storage bin of the two temporary storage bins lines up with the outlet of the hopper and receives the granular material in the second temporary storage bin; the active horizontal slide moves the head assembly such that the cover for the outlet of the hopper covers the outlet of the hopper; the active vertical slide moves the vertical cylinder such that the vertical cylinder receives granular material from the two temporary storage bins via the side openings of the two temporary storage bins through a first opening and a second opening of the vertical cylinder that respectively face the two temporary storage bins; and the vertical screw moves to lay the granular material on a ground surface through the discharge port in the vertical cylinder. For example, the microcomputer can comprise a (non-transitory) machine-readable medium having instructions stored thereon that, when executed by a processor of the microcomputer, perform those steps listed in the previous sentence. The machine can further comprise: a first sensor (e.g., an ultrasound sensor) at an upper portion of (the inside of) the first temporary storage bin configured to measure a fill level of the first temporary storage bin; a second sensor (e.g., an ultrasound sensor) at an upper portion of (the inside of) the second temporary storage bin configured to measure a fill level of the second temporary storage bin; and/or a third sensor (e.g., a load cell) disposed on the vertical cylinder (e.g., on the outside of the lower portion thereof) and configured to detect resistance from the ground surface and notify the at least one microcomputer that the vertical cylinder is in contact with the ground surface.

In another embodiment, a method for laying granular material (e.g., asphalt) can comprise: providing an autonomous machine as disclosed herein (and having any or all of the elements/features discussed in the previous paragraph); activating the horizontal screw to move to push the granular material out of the outlet of the hopper; activating the active horizontal slide to move the head assembly such that the front opening of a first temporary storage bin of the two temporary storage bins lines up with the outlet of the hopper and receives the granular material in the first temporary storage bin; after the first temporary storage bin is filled to a first predetermined level, activating the active horizontal slide to move the head assembly such that the front opening of a second temporary storage bin of the two temporary storage bins lines up with the outlet of the hopper and receives the granular material in the second temporary storage bin; after the second temporary storage bin is filled to a second predetermined level, activating the active horizontal slide to move the head assembly such that the cover for the outlet of the hopper covers the outlet of the hopper; activating the active vertical slide to move the vertical cylinder such that the vertical cylinder receives granular material from the two temporary storage bins via the side openings of the two temporary storage bins through a first opening and a second opening of the vertical cylinder that respectively face the two temporary storage bins; and activating the vertical screw to move to lay the granular material on a ground surface through the discharge port in the vertical cylinder. The method can further comprise: receiving first images from a front-facing image sensor connected to the frame of the machine; and steering the machine based on the first images. The method can further comprise: receiving second images from a downward-facing image sensor connected to the frame of the machine; and mapping contours of the ground surface (e.g., potholes in the ground surface) based on the second images. The method can further comprise, after the second temporary storage bin is filled to a second predetermined level, deactivating the horizontal screw. The method can further comprise repeating the steps after the vertical cylinder is empty or nearly empty (e.g., less than 10% full or less than 15% full). The method can further comprise: receiving notification from a first sensor (e.g., an ultrasound sensor) at an upper portion of (the inside of) the first temporary storage bin that the first predetermined level has been reached in the first temporary storage bin; receiving notification from a second sensor (e.g., an ultrasound sensor) at an upper portion of (the inside of) the second temporary storage bin that the second predetermined level has been reached in the second temporary storage bin; and/or receiving notification from a third sensor (e.g., a load cell) disposed on the vertical cylinder (e.g., on the outside of the lower portion thereof) that the vertical cylinder is in contact with the ground surface.

DETAILED DESCRIPTION

Embodiments of the subject invention provide novel and advantageous systems, devices, machines, and methods for granular material laying (e.g., asphalt laying). A granular material laying machine can include at least one (e.g., one or two) small storage bin that moves with a distribution head to temporarily store a granular material. The small storage bin(s) can be filled when the distribution head brings each in front of an exit hole of a main storage bin (separate from the small storage bin(s) and larger than the small storage bin(s)). While the distribution head discharges the granular material at the desired locations, the small temporary storage bin(s) provide(s) the material. The granular material laying machine can be, for example, an asphalt laying machine (e.g., an autonomous asphalt laying machine (AALaM), though embodiments are not limited thereto.

In embodiments of the subject invention, at least one small temporary storage bin is fixed to a distribution head. The distribution head is designed to discharge granular material at the desired locations while it moves on a linear table. The small temporary storage bin(s) is/are used to take the granular material from the main storage bin(s) when it/they are in line with the exit hole. The small temporary storage bin(s) provide(s) material to the distribution head when it moves away from the exit hole. Instead of using a pipe between the main storage bin(s) and a distribution head, the at least one small temporary storage bin is used, thereby advantageously eliminating the need for a pipe. Elimination of pipe allows bringing the bottom of the main storage bin to the same level as the distribution head. This configuration leads to the center of gravity of the main storage bin being low, thereby increasing the stability of the vehicle. In addition, when hot and corrosive materials (e.g., hot asphalt) are distributed, the life of a pipe (if present) is short, and such pipes are expensive to replace. Thus, by eliminating the pipe, the operational cost is reduced and reliability is increased.

Figure 1:
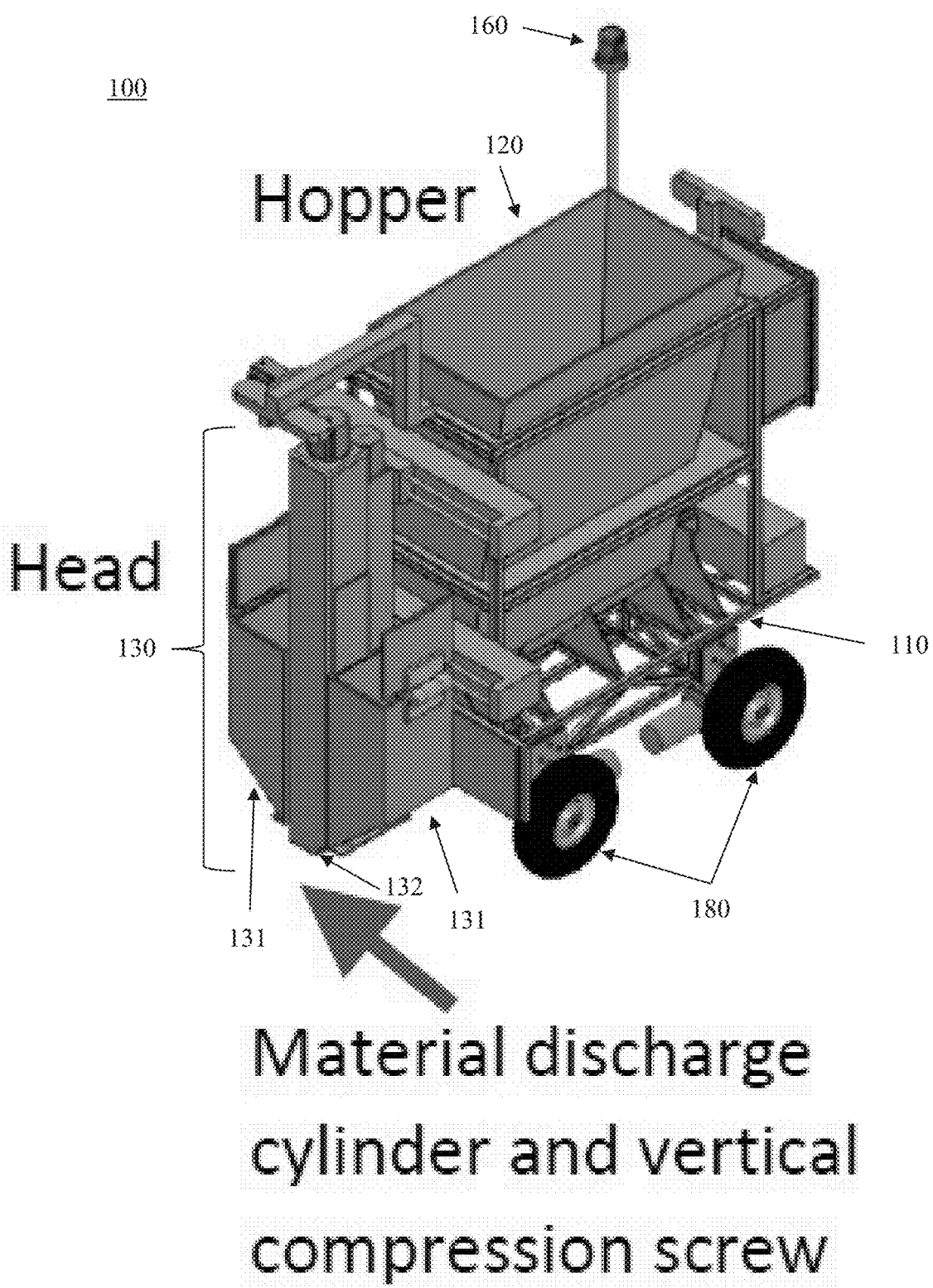
FIG. 1 shows a perspective view of an autonomous asphalt laying machine, according to an embodiment of the subject invention.
Figure 2:
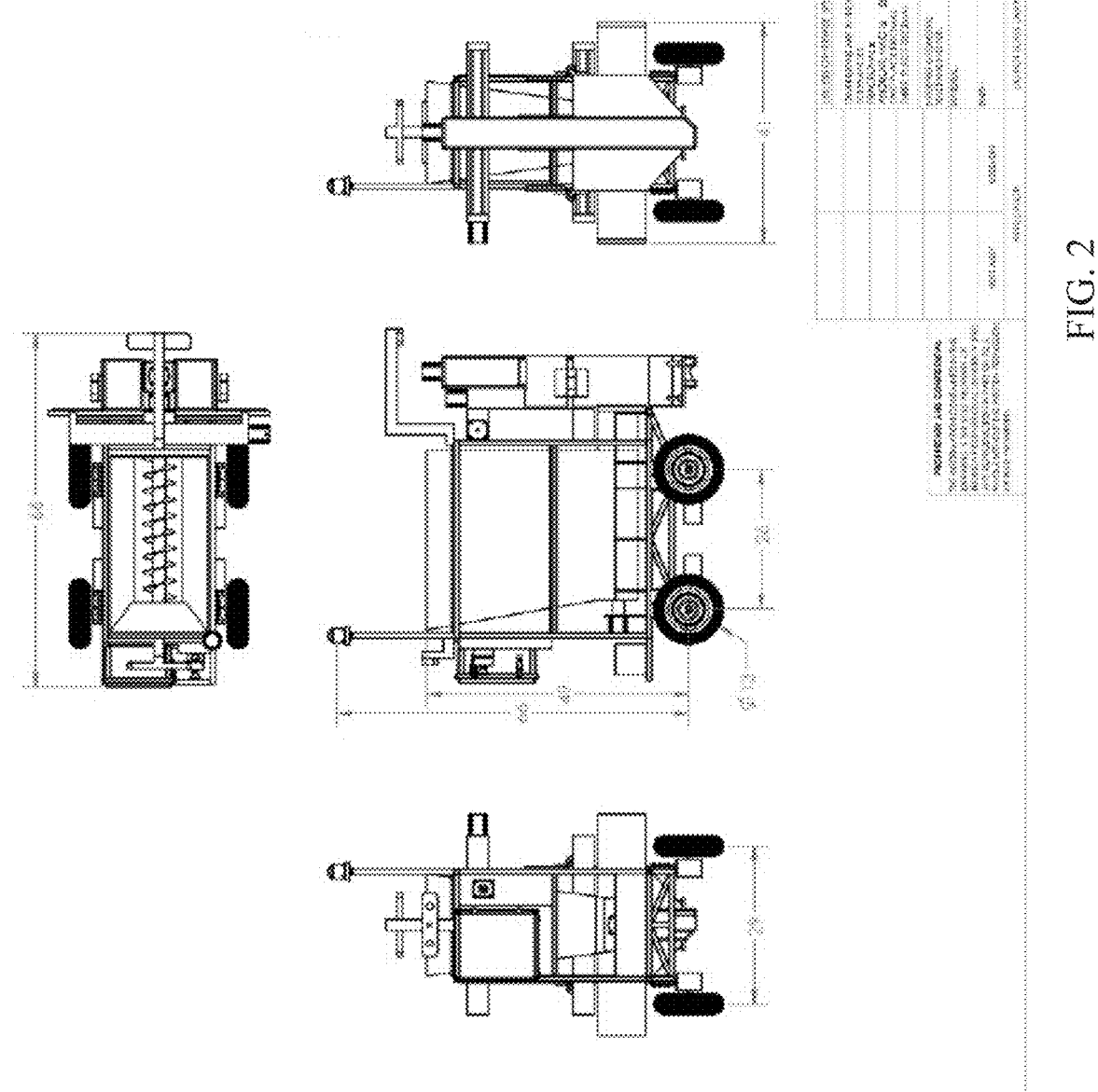
FIG. 2 shows schematic views of an autonomous asphalt laying machine, according to an embodiment of the subject invention.
Figure 3:
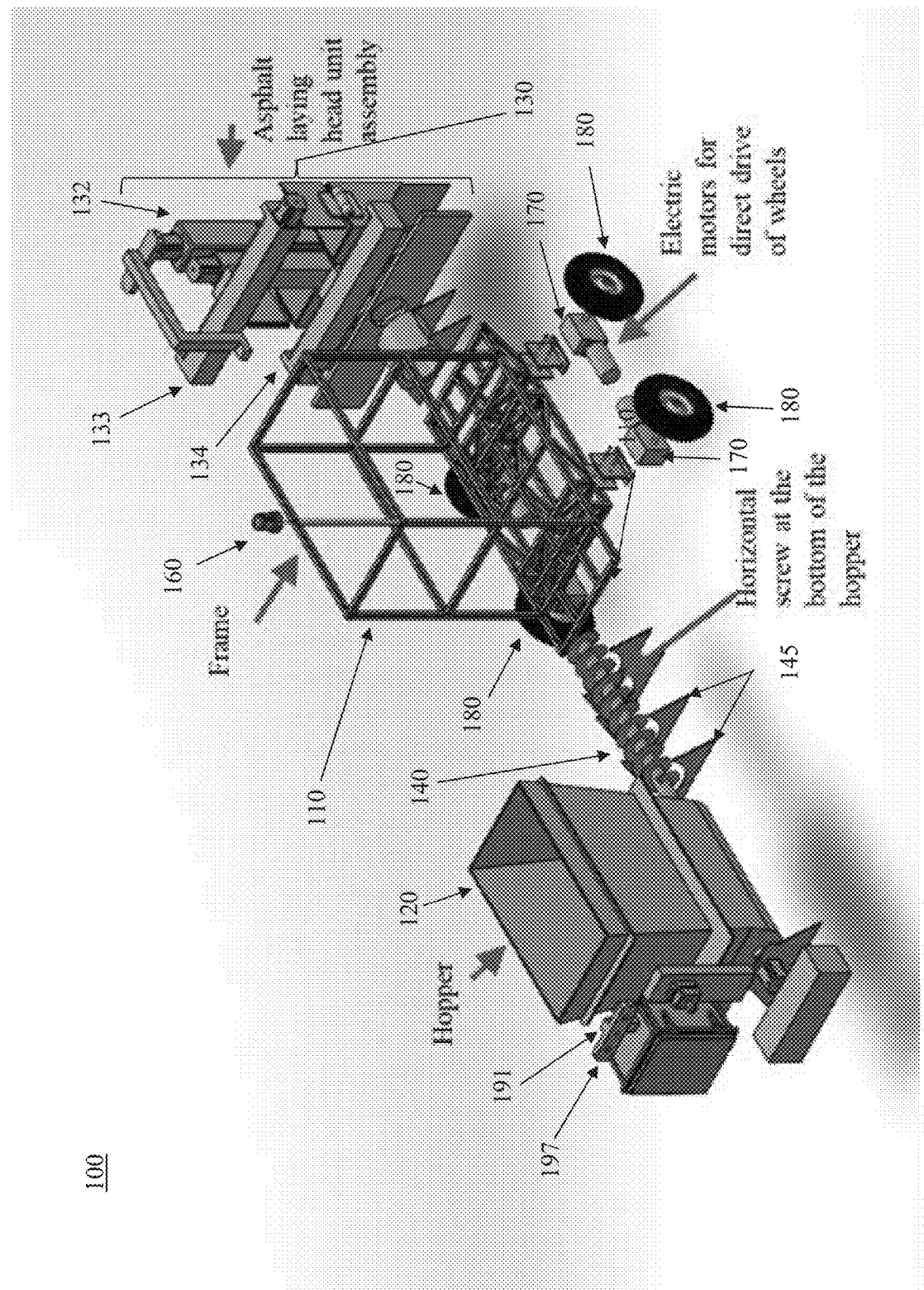
FIG. 3 shows an exploded view of an autonomous asphalt laying machine, according to an embodiment of the subject invention.
Figure 4:
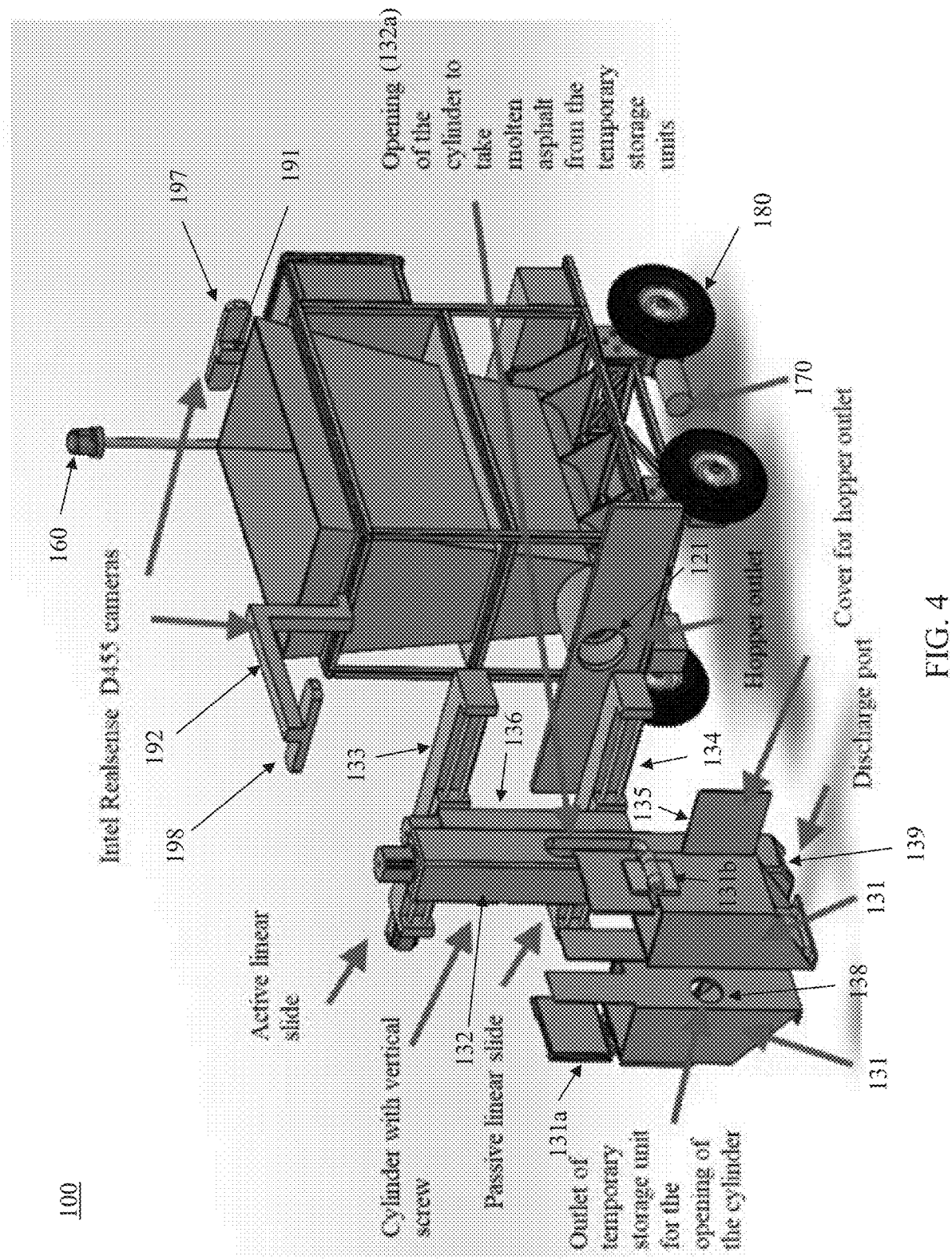
FIG. 4 shows an exploded view of a head assembly of an autonomous asphalt laying machine, according to an embodiment of the subject invention.
Figure 5:
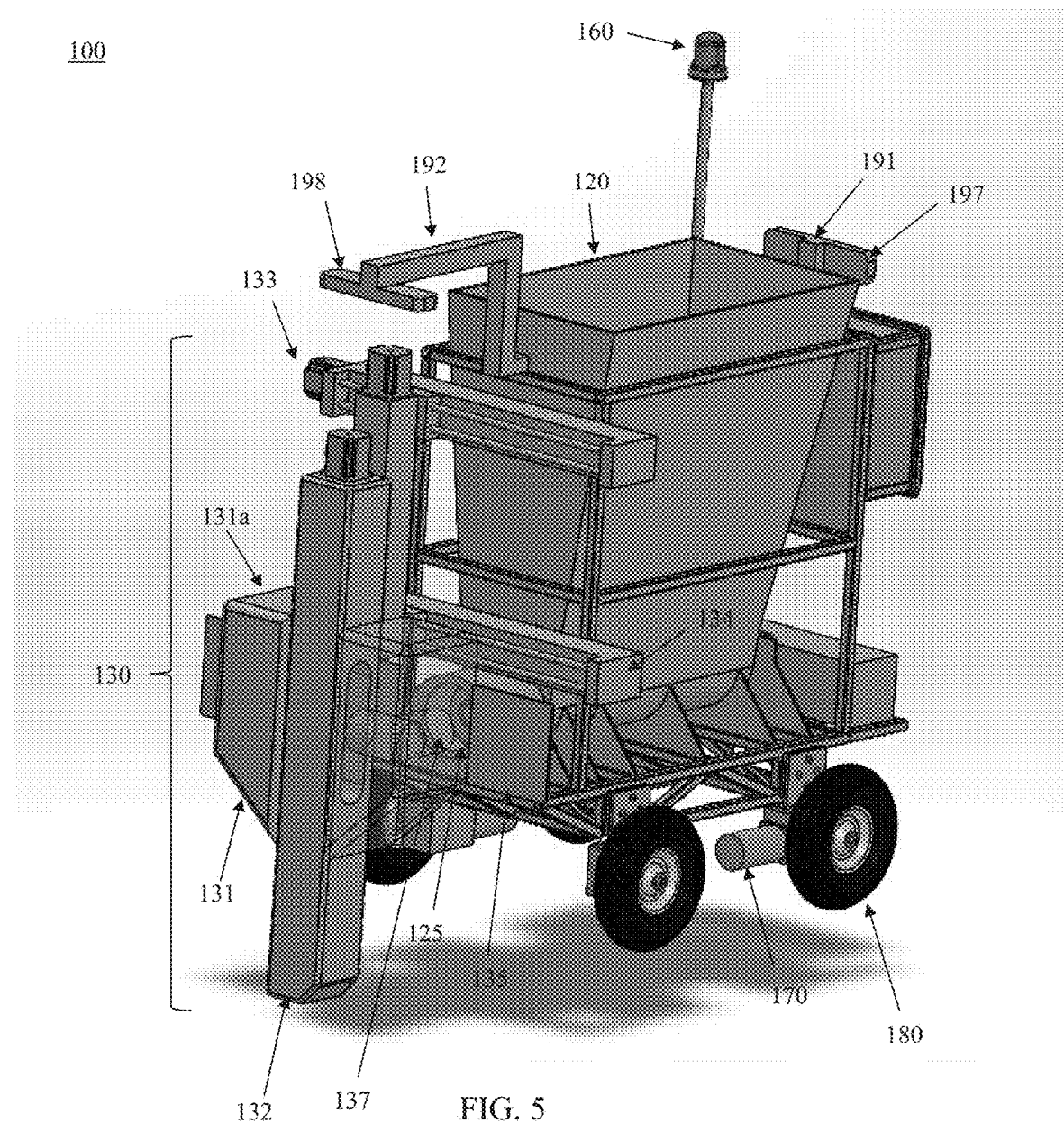
FIG. 5 shows a perspective view of an autonomous asphalt laying machine, according to an embodiment of the subject invention.
Figure 6:
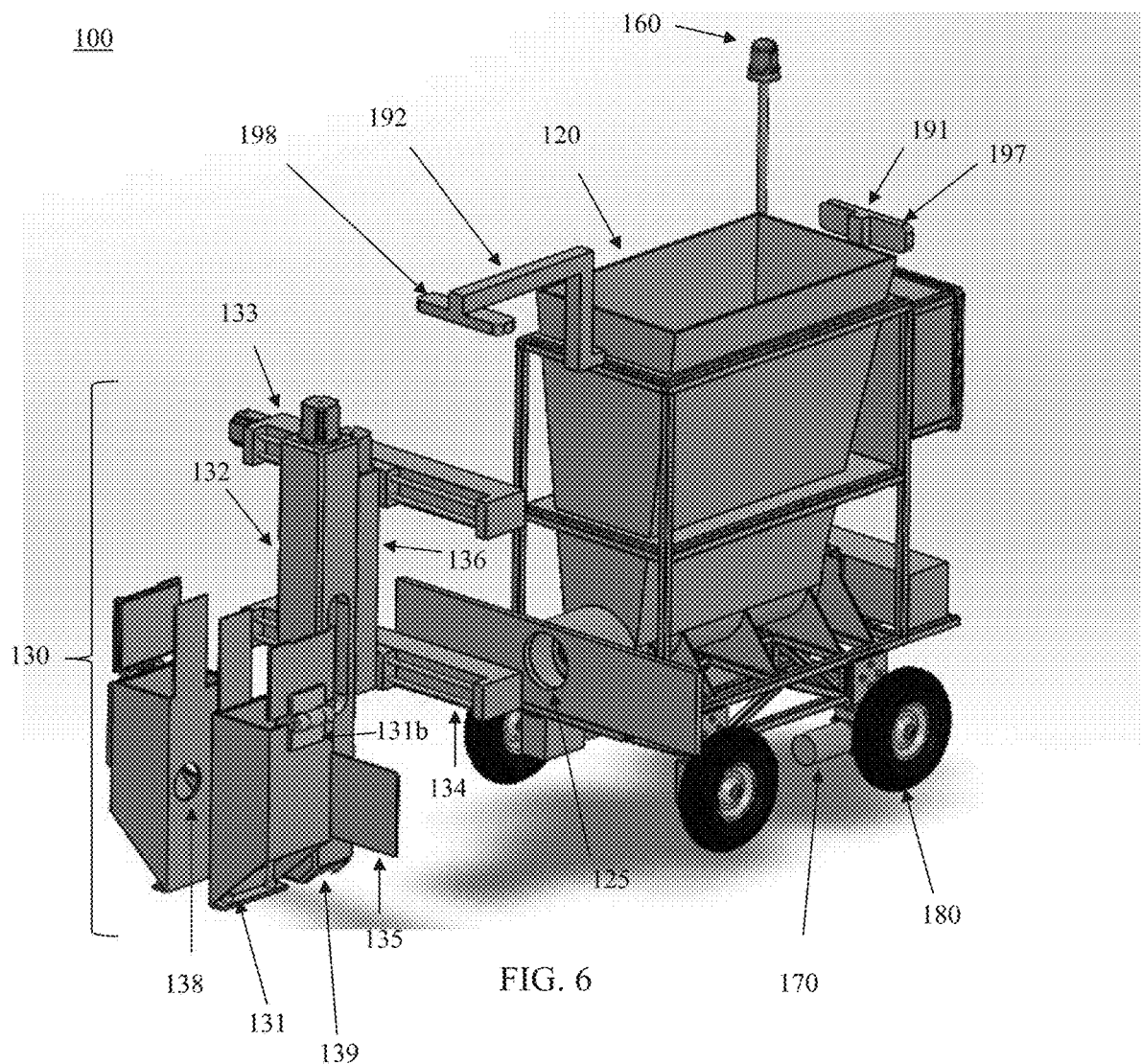
FIG. 6 shows a perspective view of an autonomous asphalt laying machine, according to an embodiment of the subject invention, with the head assembly in an exploded view.
Figure 7:
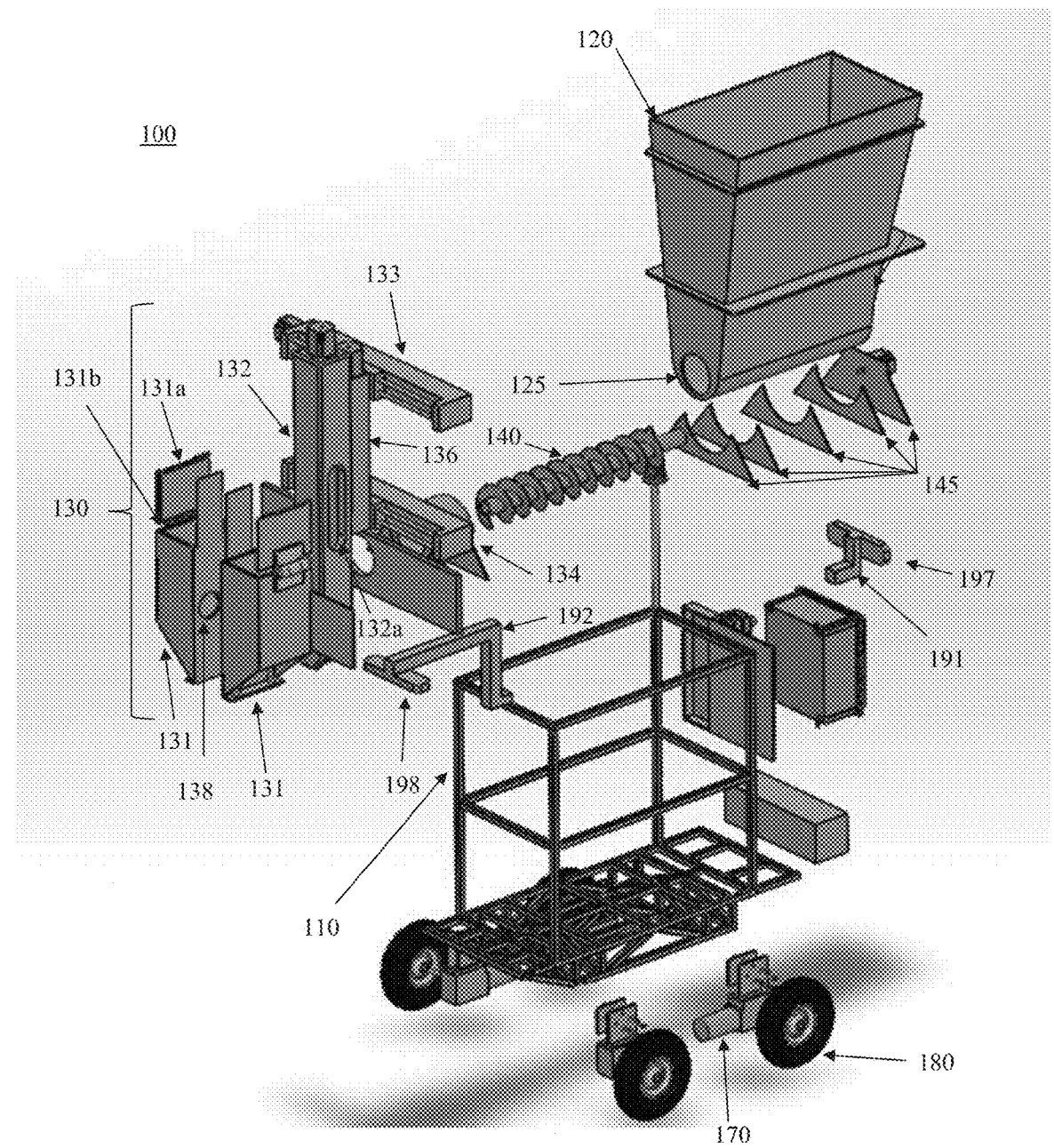
FIG. 7 shows a perspective view of an autonomous asphalt laying machine, according to an embodiment of the subject invention, with the head assembly in an exploded view.

FIG. 1 shows a perspective view of an AALaM 100, according to an embodiment of the subject invention; FIG. 2 shows schematic views of the AALaM 100; FIG. 3 shows an exploded view of the AALaM 100; FIG. 4 shows an exploded view of a head assembly of the AALaM 100; FIGS. 5-7 show perspective views of the AALaM 100, with FIG. 7 showing the head assembly 130 in an exploded view. Referring to FIGS. 1-7, the AALaM 100 can include a hopper 120 (i.e., main storage bin) and head 130 installed on a frame 110 (e.g., a steel frame). The frame can include solid bars (e.g., solid steel bars) with, e.g., a square cross-section (e.g., a 1-inch by 1-inch square cross-section, though embodiments are not limited thereto). The large hopper 120 can be carried by the frame 110 to hold molten asphalt. The hopper can be constructed of, for example, welding steel sheet metal plates, though embodiments are not limited thereto. A screw 140 (e.g., a horizontal screw) can be disposed at the bottom of the hopper 120 to move the molten asphalt to the opening 125 of the hopper 120 to fill the temporary storage spaces 131 of the head 30. The horizontal screw 140 at the bottom of the hopper 120 can have a constant root diameter, and it can be driven by a motor (e.g., a direct current (DC) motor with or without an encoder). The screw 140 can be disposed on one or more support pieces 145, which may be shaped, for example, as depicted in FIGS. 3 and 7. The hopper 120 can be designed/configured to be as close to the ground as possible in order to lower the center of gravity to let the AALaM 100 work at different slopes while minimizing difficulties.

An active linear slide 133 and a passive linear slide 134 can be attached horizontally to the back of the frame 110 to carry a head assembly 130 to discharge the molten asphalt on the ground. The head assembly 130 can comprise at least one (e.g., one or two) temporary storage units 131 and a vertical cylinder 132. The entire head assembly 130 can move side-to-side (e.g., y-axis; or horizontally as depicted in the figures) on the linear slides 133,134. The active linear slide 133 can be driven by a motor (e.g., a DC electric motor with or without an encoder), and the passive slide 134 can allow movement based on the motor of the active slide 133. The vertical cylinder 132 of the head 130 can move up and down on a vertical linear slide 136. A motor (e.g., a DC motor with or without an encoder) can drive the vertical linear slide 136 of the cylinder 132 (z-axis; or vertically as depicted in the figures). The cylinder 132 can carry a screw 132b with a tapered root diameter to compress the asphalt before releasing it. This screw 132b can be driven by a motor (e.g., a DC motor with or without an encoder). The cylinder 132 can include an opening 132a on to receive molten asphalt from the temporary storage units 131. The cylinder 132 can include a discharge port 139 at a lower portion thereof. The head 130 can further include a cover 135 for the hopper outlet. Each temporary storage unit 131 can include an openable cover 131a attached thereto by a hinge 131b or similar connection that allows the cover 131a to open and close. Each temporary storage unit 131 can include an opening 138 on a side wall thereof (e.g., on the wall facing the cylinder 132 and/or the other temporary storage unit 131) to communicate with the opening 132a of the cylinder 132 and provide molten asphalt to the cylinder 132. Each temporary storage unit 131 can also include an opening 137 on a front wall thereof (e.g., on the wall facing the hopper 120) to communicate with the outlet 125 of the hopper 120 and receive molten asphalt therefrom.

At least one image sensor 197,198 (e.g., camera) can be attached to the frame 110. For example, one forward-facing 197 and one downward-facing 198 camera can be attached to the front and back, respectively, of the frame 110, and they can be attached via arm connection 191 and arm connection 192, respectively. The front-facing camera 197 can provide images to steer the vehicle and to detect obstacles. The downward-facing camera 198 can take pictures of the completed stripes and the ground surface where the asphalt will be laid. Also, the downward-facing camera 198 can be capable of mapping contours of potholes. Four separate motors 170 (e.g., DC motors) can be attached to the bottom of the frame (and can be attached to the wheels 180) to move and steer the AALaM 100. A flashing light 160 and/or siren can be included and configured to alert the operator when the machine starts to move.

Figure 8:
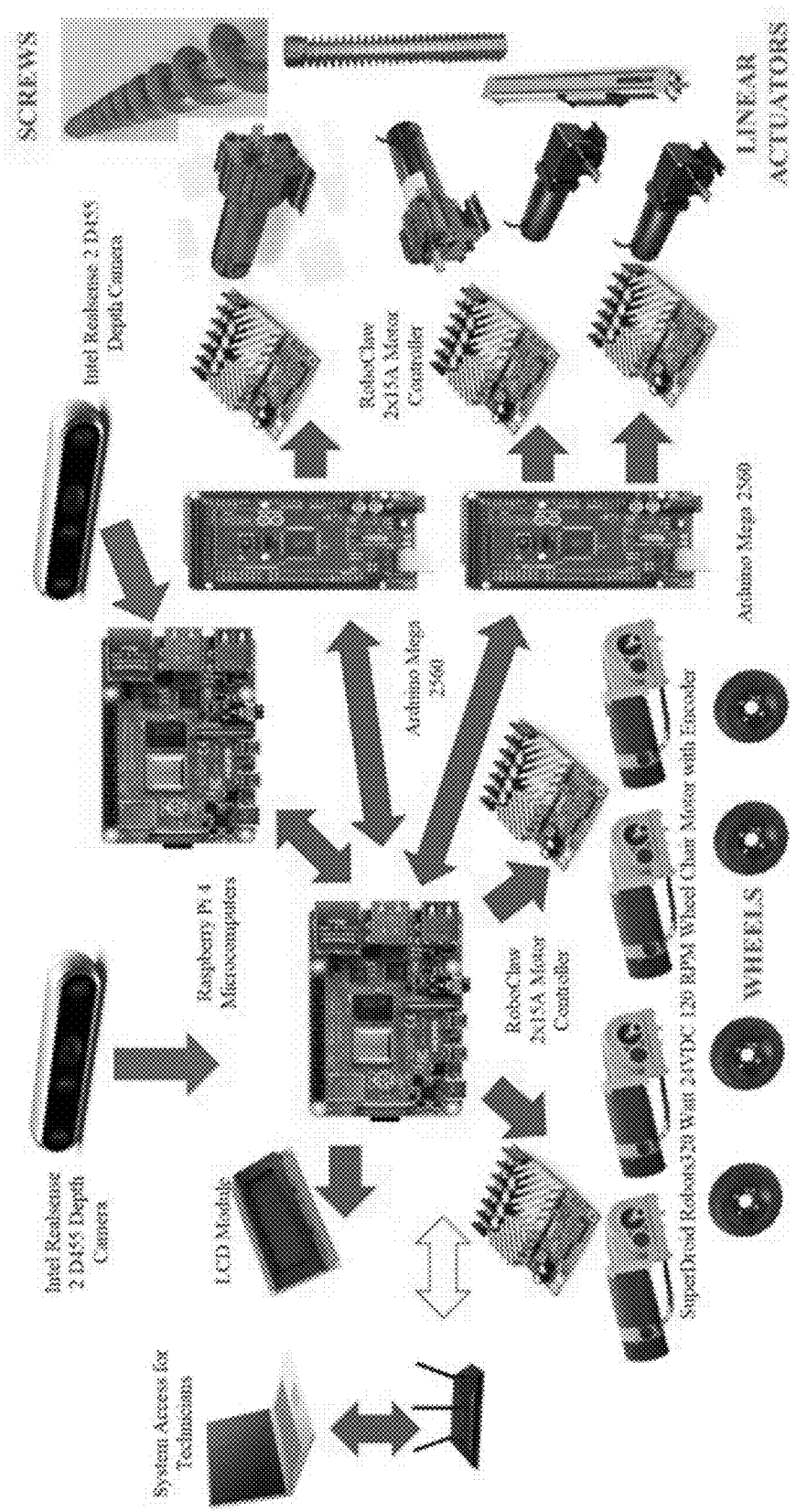
FIG. 8 shows images of electronic components that can be included in an autonomous asphalt laying machine, according to an embodiment of the subject invention.

FIG. 8 shows an image of electronic components that can be included in the AALaM. Referring to FIG. 8, the system can include at least one (e.g., two) microcomputer (such as Raspberry Pi 4 microcomputers) and at least one (e.g., two) circuit board (such as Arduino Mega 256 boards) to control the operations. At least one (e.g., six) controller (such as RoboClaw controllers) can power at least one (e.g., eight) motor (such as DC motors with encoders) to drive four wheels 180, two screws 140,132b, and two linear slides 133,136 (i.e., one motor can be respectively used for each of these elements). At least one (e.g., two) cameras 197,198 (such as depth cameras, such as Intel Realsense D455 depth cameras) can be used to provide images.

Figure 9:
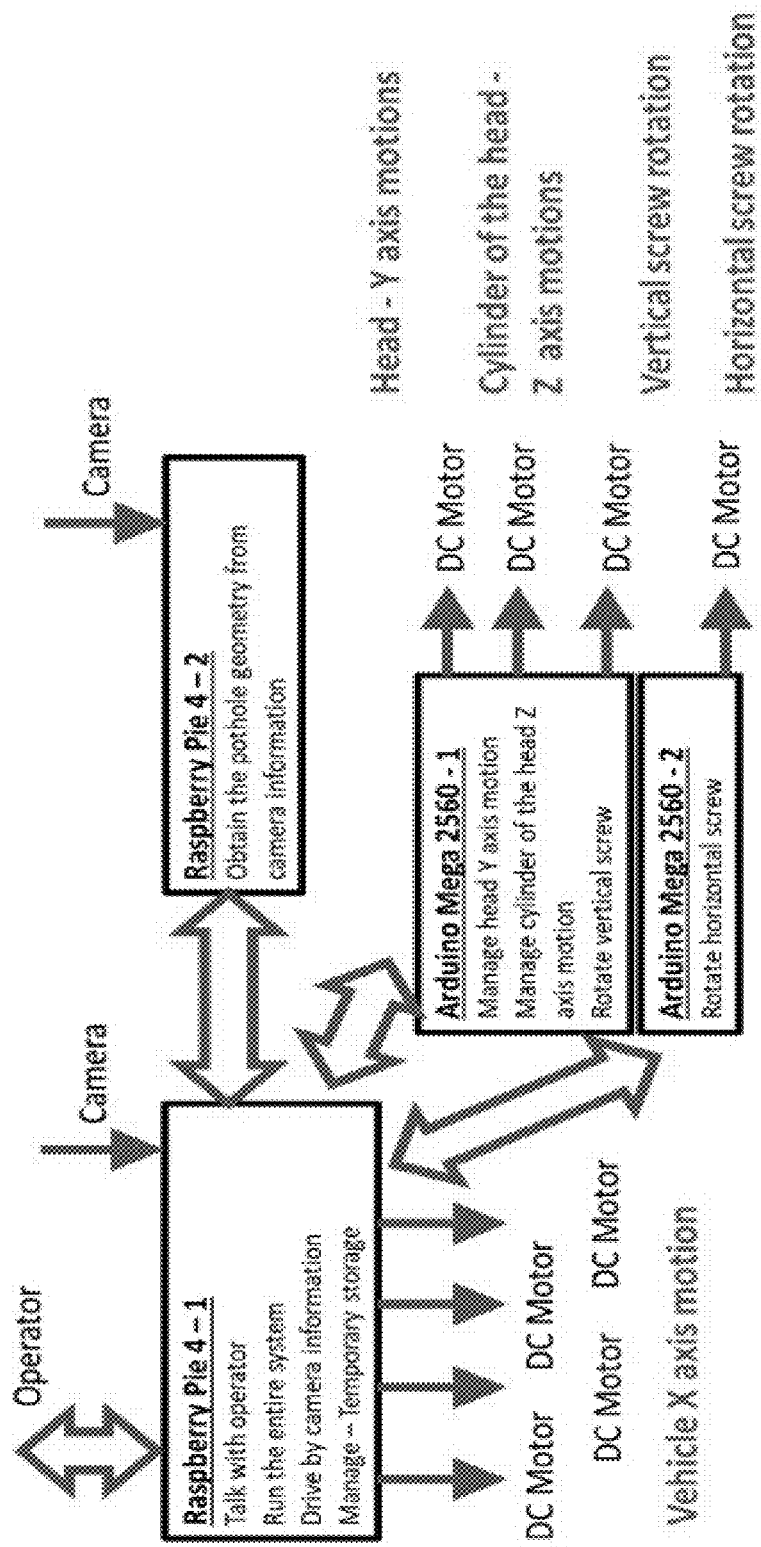
FIG. 9 shows a flow diagram of microcomputers, tasks of the microcomputers, and created motions, in an autonomous asphalt laying machine, according to an embodiment of the subject invention.

The responsibilities of the microcomputers, boards, and controlled actions are outlined in FIG. 9. The at least one microcomputer can be the master of the AALaM and operate the system according to the instructions of a user/technician (e.g., by using a robot operating system (ROS) program). It can communicate with the technician's computer (e.g., wirelessly, such as via WiFi) and/or using a display (such as a liquid crystal display (LCD)). It can drive the AALaM towards a target on a straight path, and it can detect obstacles on its path and take the necessary action either by asking its removal or stopping. The at least one microcomputer can request a board/microcontroller to bring the head to the loading position to fill the temporary storage unit(s). When the head comes to the correct location, it can request (another) board/microcontroller to turn the horizontal screw to fill the temporary storage unit(s) until one or more sensor (e.g., ultrasonic sensor) confirms that the temporary storage unit(s) is/are filled. Either one or two temporary storage units can be disposed on the AALaM, depending on the space availability during the asphalt laying process. Either one or two storage units can be filled, depending on the need.

In an embodiment, a target can be represented by a mark (e.g., an "X", such as a red "X") placed on a board (e.g., a white board). The AALaM can use the front-facing image sensor connected to a microcomputer to locate the target in three-dimensional (3D) space and sense any obstacles on the path to the target. The image sensor can provide a point cloud of distances and/or one or more images. The y- and x-positions of the target can be determined by using software (e.g., vision software) on the microcomputer. A fast region-based convolutional neural network (RB-CNN) technique can be used to classify objects in different categories (e.g., the target and obstacles) and determine their locations on the frame. A separate node can use the location of the target or the obstacle to send driving commands to a motor node. With the point cloud stream a different node can determine how far the vehicle is from any object and send driving commands to the motor node. Both the image feed and the point cloud can be used to determine the target's size and distance from the vehicle to generate a proper response. A technician can be warned as soon as an obstacle is detected. The vehicle can stop immediately if the obstacle is close to the vehicle (e.g., within a predetermined distance threshold, such as 5 feet, 4 feet, 3 feet, 2 feet, or 1 foot).

Figure 10:
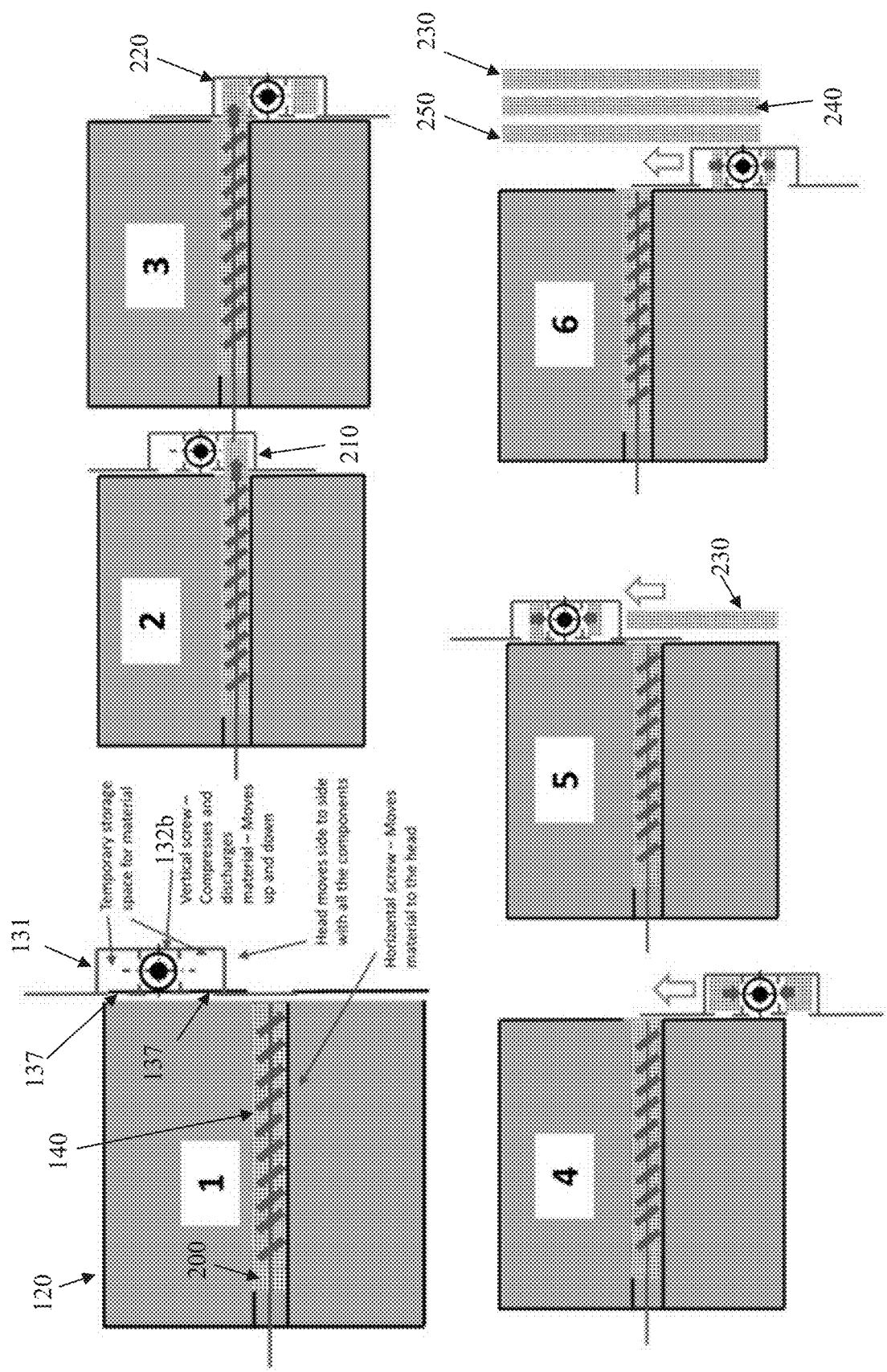
FIG. 10 shows a flow diagram of operation of temporary storage unit(s) in an autonomous asphalt laying machine, according to an embodiment of the subject invention. The label (1) is for the start; the label (2) is for filling storage unit 2; the label (3) is for filling storage unit 2; the label (4) is for ready to lay asphalt; the label (5) is for first stripe is almost completed; and the label (6) is for ready to lay fourth stripe.

In order to lower the center of gravity of the AALaM 100, the hopper 120 can be located as close to the ground as possible. The outlet 125 of the hopper 120 where the horizontal screw 140 pushes the asphalt 200 can be very low (e.g., less than 24 inches, 20 inches, 18 inches, 17 inches, 16 inches, 15 inches, 14 inches, 13 inches, 12 inches, 11 inches, 10 inches, 9 inches, 8 inches, 7 inches, 6 inches, 5 inches, 4 inches, or 3 inches from the ground). The temporary storage unit(s) 131 can be filled from this outlet 125, store the asphalt temporarily, and provide continuous flow to the vertical cylinder 132 of the head assembly 130. Use of the temporary storage unit(s) 131 is demonstrated in FIG. 10. The head 130 can move to bring the opening 137 of a temporary storage unit 131 in front of the outlet 125 of the hopper 120 (see (2) in FIG. 10). The horizontal screw 140 can rotate until the asphalt is filled 210 in the temporary storage unit 131 and a sensor (e.g., an ultrasound sensor) at the top of the temporary storage unit 131 confirms that it reached the desired level. The head 130 can then move and bring the other temporary storage unit 131 (if present) in front of the outlet 125 of the hopper 120. The filling operation can then be repeated to fill asphalt 220 in the other temporary storage unit 131 (see (3) in FIG. 10). The head 130 can move to the desired location and asphalt laying can start after the temporary storage unit(s) 131 is/are filled. The cylinder 132 at the middle of the head 130 can take the asphalt 210,220 from the temporary storage unit(s) 131 while it lays asphalt, such as in rows 230,240,250 (see (4), (5), and (6) in FIG. 10).

After the temporary storage unit(s) 131 is/are filled, the head 130 can move to the position where the asphalt laying operation can start. The cylinder 132 that carries the vertical screw 132b can move down until it touches the ground and a sensor (e.g., a load cell) detects the resistance. The vertical screw 132b can start to rotate at that moment (or thereafter), and asphalt can be laid to the ground while the cylinder 132 moves up slowly until it reaches to the desired asphalt level. Then, the screw 132b can stop, and the cylinder 132 can move up (e.g., one inch or about one inch) to have some clearance before the lateral motion starts. The head can move along the y-axis (e.g., two inches or about two inches along the y-axis), and the cylinder 132 can repeat the sequence discussed above. When the asphalt at the temporary storage unit(s) 131 is emptied, the head 130 can move to the proper location to fill the temporary storage unit(s) 131 again.

Figure 11:
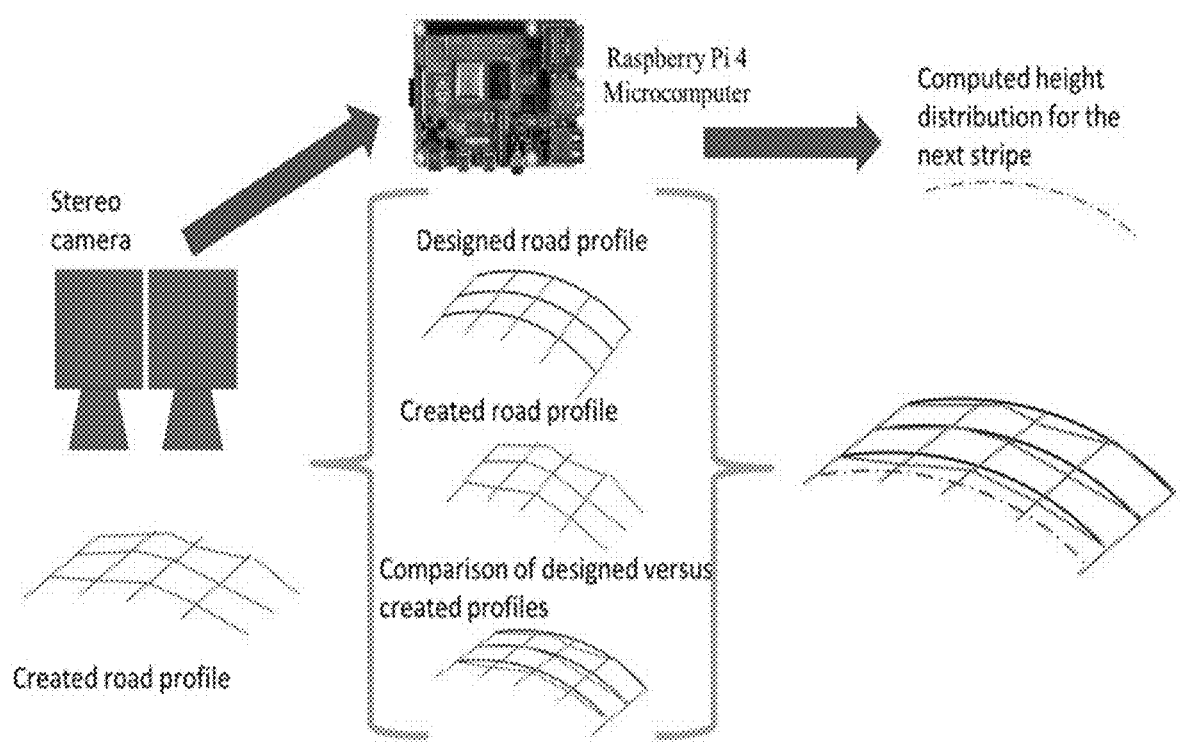
FIG. 11 shows operation of a camera (e.g., a stereo depth camera) and a microcomputer (e.g., a Raspberry Pi 4 microcomputer) to obtain a surface profile of completed asphalt stripes and a ground profile to determine heights of a coming asphalt stripe, according to an embodiment of the subject invention.

The AALaM 100 can control the height of each asphalt pile 230,240,250 (e.g., square-shaped asphalt pile) it lays on the ground. The user can enter a programmed surface profile that can be used as reference. The downward-facing image sensor (e.g., stereo depth camera) can scan the surfaces of the recently completed asphalt stripes and the ground surface where the next stripe will be laid. FIG. 11 shows the programmed and created surface profiles. The downward-facing image sensor 198 can provide the data to the assigned microcomputer (e.g., Raspberry Pi 4 microcomputer). This image sensor can compare the height distributions of the recently-laid asphalt surface stripes with the ground profile of the next stripe that will be laid and then calculate the proper height of each asphalt pile (e.g., square-shaped asphalt pile) to be laid in order to create the programmed stripe profile. If there are speed bumps, rumble strips, or other predetermined profiles, these geometries can be created when the asphalt is laid and require minimum work to be ready for daily operations.

In AALaMs, it is a challenge to transport the granular material from the fixed exit hole of the main storage bin to the moving distribution head. In the related art, a pipe is used. However, the distance between the fixed and moving points of the pipe changes and fixed point should be higher to move the material reliably. If the exit point of the main storage bin is put high enough, the center of gravity of the entire AALaM is high, making the AALaM have low stability. Also, the pipe should be flexible to operate while the required length changes, and the pipe should be very durable as well. Systems and methods of embodiments of the subject invention eliminate the need for the pipe and bring the exit point of the main storage bin (hopper) to the same level (or about the same level) as the distribution head. One or two small temporary storage bins can be fixed (e.g., removably fixed) to the distribution head. When the distribution head brings the temporary storage bin(s) in front of the exit hole of the main storage bin, it is (or they are) filled with granular material. While the distribution head operates around the desired points, the temporary storage bin(s) provide(s) material to the head. Though an AALaM has been shown and discussed in detail, this is for exemplary purposes only and should not be construed as limiting. Systems and methods of embodiments of the subject invention can be applied to any granular material laying application/operation by using at least one (e.g., one or two) small storage bins that move with a distribution head to temporarily store a granular material as discussed herein. Each temporary storage bin(s) can have a volume that is, for example, no more than 10%, 15%, 20%, 25%, 30%, 35%, 40%, 45%, 50%, 55%, 60%, 65%, or 70% of the volume of the main storage bin.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An autonomous machine for laying granular material, the machine comprising:
    a frame;
    a hopper connected to the frame and having an outlet at a lower portion of a first sidewall of the hopper;
    a head assembly connected to the frame and disposed facing the first sidewall of the hopper; and
    a horizontal screw disposed in the hopper and configured to move the granular material out of the outlet of the hopper,
    the head assembly comprising:
        a vertical cylinder having a discharge port at a bottom thereof;
        a vertical screw disposed in the vertical cylinder;
        an active vertical slide configured to move the vertical cylinder in a vertical direction perpendicular to a lower surface of the hopper;
        an active horizontal slide configured to move the head assembly in a horizontal direction perpendicular to the vertical direction; and
        two temporary storage bins disposed adjacent the vertical cylinder,
    each temporary storage bin comprising a side opening facing the vertical cylinder and a front opening facing the hopper and configured to receive the granular material through the outlet of the hopper, and
    each temporary storage bin having a volume that is no more than 60% of a volume of the hopper.

2. The machine according to claim 1, further comprising a front-facing image sensor connected to the frame.

3. The machine according to claim 1, further comprising a downward-facing image sensor connected to the frame.

4. The machine according to claim 1, further comprising four wheels connected to the frame and four wheel motors respectively connected to the four wheels and configured to respectively drive the four wheels.

5. The machine according to claim 1, the vertical cylinder comprising a first opening and a second opening respectively facing the two temporary storage bins and configured to receive the granular material from the respective side openings of the two temporary storage bins.

6. The machine according to claim 1, the machine being configured such that the outlet of the hopper is no more than 12 inches above a ground surface during use.

7. The machine according to claim 1, the head assembly further comprising a passive horizontal slide configured to allow the head assembly to move in the horizontal direction.

8. The machine according to claim 1, the horizontal screw having a constant root diameter, and
    the vertical screw having a tapered root diameter configured to compress the granular material before it is released through the discharge port of the vertical cylinder.

9. The machine according to claim 1, further comprising:
    at least one microcomputer configured to operate the machine;
    an active vertical slide motor configured to drive the active vertical slide;
    an active horizontal slide motor configured to drive the active horizontal slide;
    a vertical screw motor configured to drive the vertical screw;
    a horizontal screw motor configured to drive the horizontal screw;
    four wheels connected to the frame and four wheel motors respectively connected to the four wheels and configured to respectively drive the four wheels; and
    at least one controller configured to power the active vertical slide motor, the active horizontal slide motor, the vertical screw motor, the horizontal screw motor, and the four wheel motors.

10. The machine according to claim 9, further comprising a front-facing image sensor connected to the frame and a downward-facing image sensor connected to the frame,
    the front-facing image sensor being configured to provide images to the at least one microcomputer to assist in steering the machine and detecting obstacles, and
    the downward-facing image sensor being configured to provide images of already-laid granular material and of a ground surface to the at least one microcomputer to assist in mapping contours of the ground surface.

11. The machine according to claim 9, the head assembly further comprising a cover for the outlet of the hopper, and
    the at least one microcomputer being configured to operate the machine such that:
        the active horizontal slide moves the head assembly such that the front opening of a first temporary storage bin of the two temporary storage bins lines up with the outlet of the hopper and receives the granular material in the first temporary storage bin;
        the horizontal screw moves to push the granular material out of the outlet of the hopper;
        the active horizontal slide moves the head assembly such that the front opening of a second temporary storage bin of the two temporary storage bins lines up with the outlet of the hopper and receives the granular material in the second temporary storage bin;
        the active horizontal slide moves the head assembly such that the cover for the outlet of the hopper covers the outlet of the hopper;
        the active vertical slide moves the vertical cylinder such that the vertical cylinder receives granular material from the two temporary storage bins via the side openings of the two temporary storage bins through a first opening and a second opening of the vertical cylinder that respectively face the two temporary storage bins; and the vertical screw moves to lay the granular material on a ground surface through the discharge port in the vertical cylinder.

12. The machine according to claim 11, further comprising:

a first sensor at an upper portion of the first temporary storage bin configured to measure a fill level of the first temporary storage bin;

a second sensor at an upper portion of the second temporary storage bin configured to measure a fill level of the second temporary storage bin; and a third sensor disposed on the vertical cylinder and configured to detect resistance from the ground surface and notify the at least one microcomputer that the vertical cylinder is in contact with the ground surface.

13. A method for laying granular material, the method comprising:

providing the autonomous machine according to claim 1;

activating the horizontal screw to move to push the granular material out of the outlet of the hopper;

activating the active horizontal slide to move the head assembly such that the front opening of a first temporary storage bin of the two temporary storage bins lines up with the outlet of the hopper and receives the granular material in the first temporary storage bin;

after the first temporary storage bin is filled to a first predetermined level, activating the active horizontal slide to move the head assembly such that the front opening of a second temporary storage bin of the two temporary storage bins lines up with the outlet of the hopper and receives the granular material in the second temporary storage bin;

after the second temporary storage bin is filled to a second predetermined level, activating the active horizontal slide to move the head assembly such that the cover for the outlet of the hopper covers the outlet of the hopper;

activating the active vertical slide to move the vertical cylinder such that the vertical cylinder receives granular material from the two temporary storage bins via the side openings of the two temporary storage bins through a first opening and a second opening of the vertical cylinder that respectively face the two temporary storage bins; and activating the vertical screw to move to lay the granular material on a ground surface through the discharge port in the vertical cylinder.

14. The method according to claim 13, further comprising:

receiving first images from a front-facing image sensor connected to the frame of the machine; and steering the machine based on the first images.

15. The method according to claim 13, further comprising:

receiving second images from a downward-facing image sensor connected to the frame of the machine; and mapping contours of the ground surface based on the second images.

16. The method according to claim 13, further comprising, after the second temporary storage bin is filled to a second predetermined level, deactivating the horizontal screw.

17. The method according to claim 13, further comprising:

receiving notification from a first sensor at an upper portion of the first temporary storage bin that the first predetermined level has been reached in the first temporary storage bin;

receiving notification from a second sensor at an upper portion of the second temporary storage bin that the second predetermined level has been reached in the second temporary storage bin.

18. The method according to claim 13, further comprising receiving notification from a third sensor disposed on the vertical cylinder that the vertical cylinder is in contact with the ground surface.

19. The method according to claim 13, the granular material being asphalt.

20. An autonomous machine for laying granular material, the machine comprising:

a frame;

a hopper connected to the frame and having an outlet at a lower portion of a first sidewall of the hopper;

a front-facing image sensor connected to the frame;

a downward-facing image sensor connected to the frame;

four wheels connected to the frame and four wheel motors respectively connected to the four wheels and configured to respectively drive the four wheels;

a head assembly connected to the frame and disposed facing the first sidewall of the hopper; and a horizontal screw disposed in the hopper and configured to move the granular material out of the outlet of the hopper, the head assembly comprising:

a vertical cylinder having a discharge port at a bottom thereof;

a vertical screw disposed in the vertical cylinder;

an active vertical slide configured to move the vertical cylinder in a vertical direction perpendicular to a lower surface of the hopper;

an active horizontal slide configured to move the head assembly in a horizontal direction perpendicular to the vertical direction;

a passive horizontal slide configured to allow the head assembly to move in the horizontal direction;

a cover for the outlet of the hopper; and two temporary storage bins disposed adjacent the vertical cylinder, each temporary storage bin comprising a side opening facing the vertical cylinder and a front opening facing the hopper and configured to receive the granular material through the outlet of the hopper, each temporary storage bin having a volume that is no more than 60% of a volume of the hopper, the vertical cylinder comprising a first opening and a second opening respectively facing the two temporary storage bins and configured to receive the granular material from the respective side openings of the two temporary storage bins, the machine being configured such that the outlet of the hopper is no more than 12 inches above a ground surface during use, the horizontal screw having a constant root diameter, the vertical screw having a tapered root diameter configured to compress the granular material before it is released through the discharge port of the vertical cylinder, the machine further comprising:
  at least one microcomputer configured to operate the machine;
  an active vertical slide motor configured to drive the active vertical slide;
  an active horizontal slide motor configured to drive the active horizontal slide;
  a vertical screw motor configured to drive the vertical screw;
  a horizontal screw motor configured to drive the horizontal screw;
  at least one controller configured to power the active vertical slide motor, the active horizontal slide motor, the vertical screw motor, the horizontal screw motor, and the four wheel motors;
  a first sensor at an upper portion of a first temporary storage bin of the two temporary storage bin configured to measure a fill level of the first temporary storage bin;
  a second sensor at an upper portion of the second temporary storage bin of the two temporary storage bins configured to measure a fill level of the second temporary storage bin; and
  a third sensor disposed on the vertical cylinder and configured to detect resistance from the ground surface and notify the at least one microcomputer that the vertical cylinder is in contact with the ground surface,
the front-facing image sensor being configured to provide images to the at least one microcomputer to assist in steering the machine and detecting obstacles,
the downward-facing image sensor being configured to provide images of already-laid granular material and of a ground surface to the at least one microcomputer to assist in mapping contours of the ground surface, and
the at least one microcomputer being configured to operate the machine such that:
  the active horizontal slide moves the head assembly such that the front opening of the first temporary storage bin lines up with the outlet of the hopper and receives the granular material in the first temporary storage bin;
  the horizontal screw moves to push the granular material out of the outlet of the hopper;
  the active horizontal slide moves the head assembly such that the front opening of the second temporary storage bin lines up with the outlet of the hopper and receives the granular material in the second temporary storage bin;
  the active horizontal slide moves the head assembly such that the cover for the outlet of the hopper covers the outlet of the hopper;
  the active vertical slide moves the vertical cylinder such that the vertical cylinder receives granular material from the two temporary storage bins via the side openings of the two temporary storage bins through a first opening and a second opening of the vertical cylinder that respectively face the two temporary storage bins; and
  the vertical screw moves to lay the granular material on a ground surface through the discharge port in the vertical cylinder.

\* \* \* \* \*